(12) United States Patent
Easter et al.

(10) Patent No.: US 9,711,308 B2
(45) Date of Patent: Jul. 18, 2017

(54) HANDHELD DEACTIVATOR WITH INTEGRATED THERMAL SENSOR

(71) Applicants: Ronald B. Easter, Parkland, FL (US); Adam S. Bergman, Boca Raton, FL (US)

(72) Inventors: Ronald B. Easter, Parkland, FL (US); Adam S. Bergman, Boca Raton, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 112 days.

(21) Appl. No.: 14/290,325

(22) Filed: May 29, 2014

(65) Prior Publication Data
US 2015/0348727 A1    Dec. 3, 2015

(51) Int. Cl.
*H01H 47/00* (2006.01)
*H01F 13/00* (2006.01)
(Continued)

(52) U.S. Cl.
CPC .............. *H01H 47/005* (2013.01); *G01J 5/10* (2013.01); *G08B 13/248* (2013.01); *H01F 13/00* (2013.01)

(58) Field of Classification Search
CPC .............. G06K 9/00228; G08B 13/248; G08B 13/19697; G08B 21/0275; G08B 25/016;
(Continued)

(56) References Cited

U.S. PATENT DOCUMENTS 6,607,125 B1 * 8/2003 Clouser .............. G06K 7/10851
                                                235/383
7,821,386 B1 * 10/2010 Barrett .................. G06Q 10/10
                                                340/457

(Continued)

FOREIGN PATENT DOCUMENTS

CA          2429616 A1      5/2002

OTHER PUBLICATIONS

Martínez-Búrdalo, M., Sanchis, A., Martín A., Villar R. (2010) "Comparison of SAR and induced current densities in adults and children exposed to electromagnetic fields from electronic article surveillance devices; SAR and induced currents in adults and children exposed to EAS devices," Physics in Medicine and Biology, Institute of Physics and Engineering in Medicine, Bristol, GB, vol. 55, No. 4, Feb. 21, 2010, pp. 1041-1055.

(Continued)

*Primary Examiner* — Mirza Alam
(74) *Attorney, Agent, or Firm* — Fox Rothschild LLP; Robert J. Sacco; Carol E. Thorstad-Forsyth

(57) ABSTRACT

Systems (100) and methods (600) for controlling operations of a Handheld Scanning and Deactivation ("HSD") device. The methods comprise: determining whether a human is located within a defined distance range of the HSD device; preventing first operations from being performed by the HSD device which cause a magnetic field to be generated, if it is determined that said human is located within the defined distance range of said HSD device; and initiating the first operations if it is determined that the human is not located within the defined distance range of the HSD device. The first operations comprise (1) interrogation operations for detecting a presence of an electronic article surveillance security tag and/or (2) deactivation operations for deactivating an electronic article surveillance security tag.

12 Claims, 8 Drawing Sheets

(51) Int. Cl.
*G01J 5/10* (2006.01)
*G08B 13/24* (2006.01)

(58) Field of Classification Search
CPC  G08B 13/1427; G08B 13/2417; G08B 21/24;
G08B 21/0227; F16P 3/147; G07C
9/00111
USPC ..... 340/572.3, 572.1, 539.21, 539.13, 572.2;
235/383, 381, 462.45, 378, 472.01
See application file for complete search history.

(56) References Cited

U.S. PATENT DOCUMENTS

| | | | |
|---|---|---|---|
| 2005/0134459 A1* | 6/2005 | Glick | G08B 13/1427 340/572.1 |
| 2007/0205861 A1* | 9/2007 | Nair | F16P 3/14 340/5.61 |
| 2009/0045958 A1* | 2/2009 | Spano | G08B 21/24 340/572.2 |
| 2009/0289794 A1* | 11/2009 | Lai | G08B 13/1427 340/572.1 |
| 2012/0242481 A1* | 9/2012 | Gernandt | G06K 19/0705 340/539.13 |
| 2014/0254890 A1 | 9/2014 | Bergman et al. | |

OTHER PUBLICATIONS

Qingxiang Li and Om P Gandhi (2005) "Calculation of magnetic field-induced current densities for humans from EAS countertop activation/deactivation devices that use ferromagnetic cores." Physics in Medicine and Biology, Institute of Physics and Engineering in Medicine, Bristol, GB, vol. 50, No. 2, Jan. 21, 2005, pp. 373-385.

* cited by examiner

HANDHELD DEACTIVATOR WITH INTEGRATED THERMAL SENSOR

FIELD OF THE INVENTION

This document relates generally to Electronic Article Surveillance ("EAS") systems. More particularly, this document relates to handheld deactivators of EAS systems with integrated thermal sensors.

BACKGROUND OF THE INVENTION

EAS systems are well known for the prevention or deterrence of unauthorized removal of articles from a controlled area. In a typical EAS system, security tags are attached to articles to be protected. The security tags are designed to interact with an electromagnetic field located at the exit of the controlled area. If a security tag is brought into the electromagnetic field or "interrogation zone", the presence of the security tag is detected and appropriate action is taken. For a controlled area such as a retail store, the appropriate action taken for detection of a security tag may be the generation of an alarm. Some types of security tags remain attached to the articles to be protected, but are deactivated prior to authorized removal from the controlled area by a deactivation device that changes the characteristics of the security tag so that the security tag will no longer be detectable in the interrogation zone.

In some scenarios, the deactivation device includes a handheld deactivation device for use by store employees. The handheld deactivation device may be part of a handheld bar-code scanner or other battery powered device. In this case, the handheld deactivation device may be pointed at persons (e.g., members of the public) in proximity thereto. As such, the persons may experience exposure to electric and magnetic fields emitted from the handheld deactivation device at a given frequency (e.g., 3.4 KHz). Various health protection agencies restrict use of such handheld deactivation devices because of this risk of undesirable exposure of electric and magnetic fields to public persons, which can result in diminished health thereof.

SUMMARY

The present invention concerns implementing systems and methods for controlling operations of a Handheld Scanning and Deactivation ("HSD") device. The methods involve determining whether a human is located within a defined distance range of the HSD device. If it is determined that the human is located within the defined distance range of the HSD device, then the first operations are prevented from being performed by the HSD device. In contrast, performance of the first operations is initiated if it is determined that the human is not located within the defined distance range of the HSD device. The defined distance range may have a lower limit of zero centimeters and an upper limit of a value representative of the distance from the HSD device in which the magnetic field has a strength considered safe for human exposure.

In some scenarios, the first operations comprise interrogation operations for detecting a presence of an electronic article surveillance security tag or deactivation operations for deactivating an electronic article surveillance security tag. If the first operations comprise interrogation operations, then the determination as to whether a human is located in proximity to the HSD device may be performed in response to or subsequent to a detection of a barcode on an object being scanned by the HSD device. Additionally, second operations may be prevented from being performed by the HSD device if it is determined that the human is located within the defined distance range of the HSD device. In this case, the second operations comprise deactivation operations for deactivating an electronic article surveillance security tag.

In those or other scenarios, the methods further involve determining whether the human, located within the defined distance range of the HSD device, is a person other than an operator of the HSD device. When it is determined that the human is a person other than the operator, the first operations are prevented from being performed by the HSD device. In contrast, the first operations are initiated when it is determined that the human is the operator.

DESCRIPTION OF THE DRAWINGS

Embodiments will be described with reference to the following drawing figures, in which like numerals represent like items throughout the figures, and in which.

DETAILED DESCRIPTION

Figure 1:
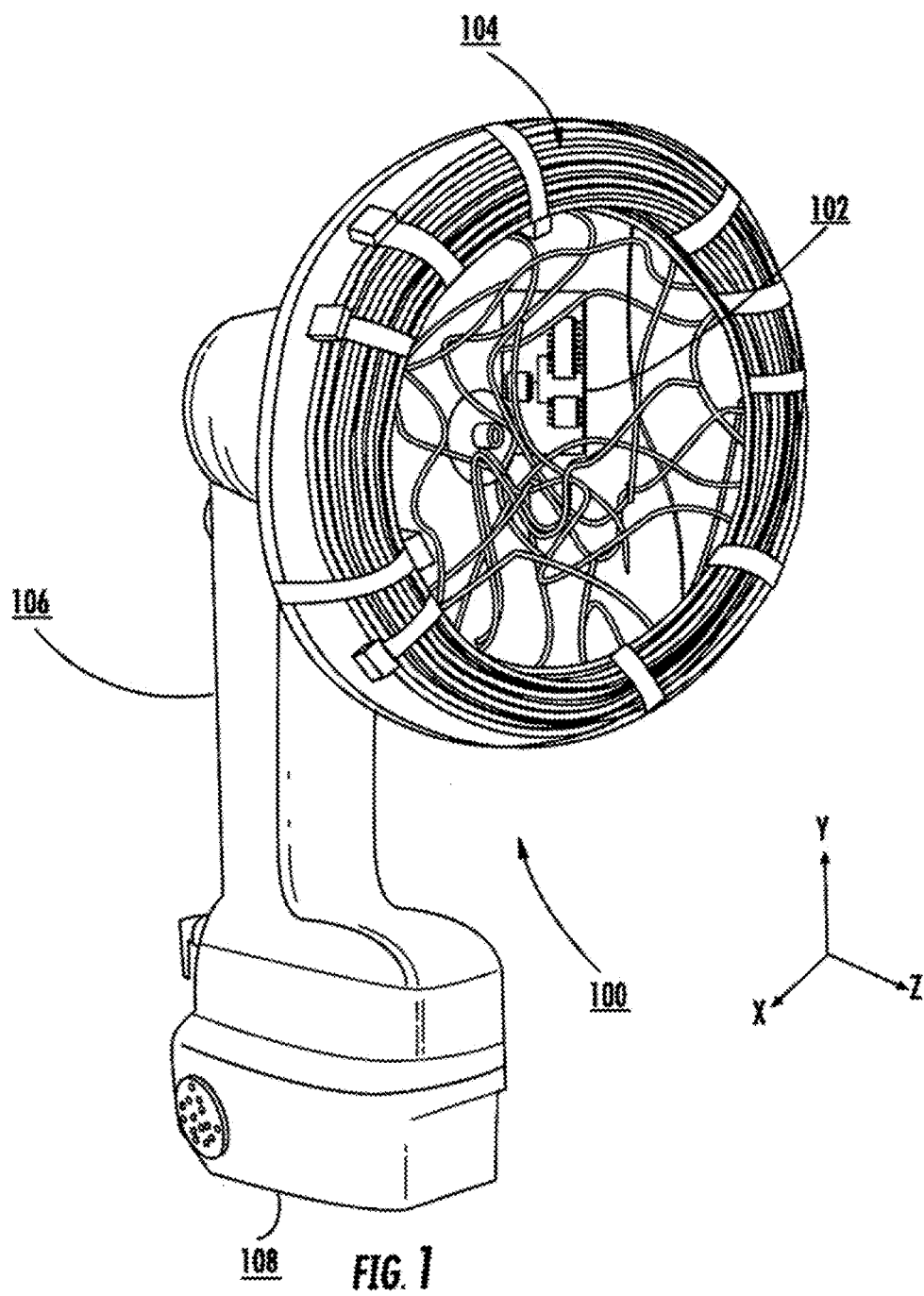
FIG. 1 is a schematic illustration of an exemplary architecture for an HSD device that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Referring now to FIG. 1, there is provided a schematic illustration of an exemplary HSD device 100 that is useful for understanding the present invention. HSD device 100 is configured for use in an EAS system as a cordless device for deactivating EAS security tags. The HSD device 100 is described below in relation to scenarios employing magnetomechanical EAS systems, which require generation of a magnetic field for deactivation of EAS security tags. The present invention is not limited in this regard. The present invention can be adapted for use with a plurality of different EAS systems and EAS security tags.

Notably, the HSD device 100 implements its electrical characteristics in a hardware package that has a relatively low overall weight for minimizing operator fatigue and a relatively low overall energy requirement for making battery operation feasible. A deactivation range of at least about three inches, a weight less than about two pounds, and a battery life of at least about twelve hours with a deactivation rate of two hundred per hour are desired.

As shown in FIG. 1, the HSD device 100 can include an air-core coil 104, an electronic circuit 102, a housing 106, and a battery 108. The air-core coil 104 has a coil size and number of amp-turns that are selected to achieve the required field level for deactivation of magnetomechanical EAS security tags out to at least about three inches from handheld scanning and deactivation device 100, while minimizing weight and battery energy. Battery 108 can be contained fully within housing 106, or plugged into a mating connector and attached to the housing 106 in a flush manner.

Exemplary architectures for the electronic circuit 102 will be described below in relation to FIGS. 2-5. Still, it should be understood that the electronic circuit 102 is configured to eliminate or at least significantly minimize the risk of a person's exposure to electric and magnetic fields emitted from the handheld deactivation device at sub-optical frequencies. Thus, the present disclosure provides an improved HSD device implementing a novel technique for initializing deactivation operations (which will be discussed in detail below), as compared to that implemented by conventional HSD devices. In effect, the HSD device of the present invention complies with the respective device regulations of various health agencies (e.g., the European Regulatory agency). In contrast, conventional HSD devices do not comply with such device regulations, and therefore the total geographic locations in which these devices can be used is limited.

Figure 2:
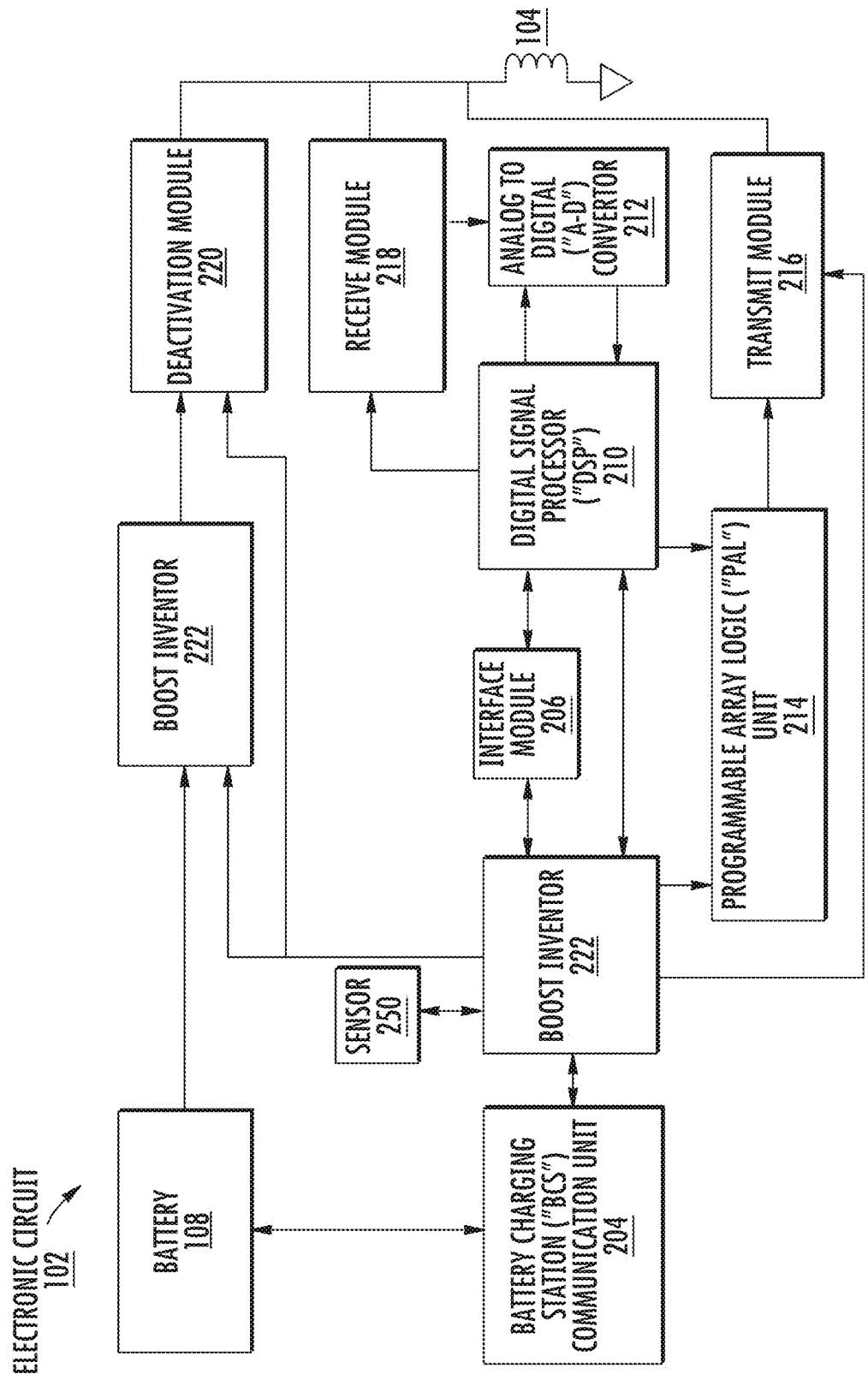
FIG. 2 is a block diagram of an exemplary architecture for an electronic circuit of the HSD shown in FIG. 1.

Referring now to FIG. 2, there is provided a block diagram of an exemplary architecture for the electronic circuit 102 of the HSD device 100 shown in FIG. 1. Notably, the HSD device 100 is configured to operate in several operational modes. The operational modes include, but are not limited to, a manual operational mode, an automatic operational mode, a hands free operational mode, a detection only mode, and/or a deactivation only mode. The operational mode of the HSD device 100 can be modified by a user thereof via an interface module 206 of the electronic circuit 102. The interface module 206 includes, but is not limited to, a display screen, switches and/or a keypad to facilitate user-software interactions.

During one or more of these operational modes, the electronic circuit 102 performs operations to detect a barcode disposed on an object. If the barcode is detected, then the electronic circuit 102 (more particularly, sensor 250 and microprocessor 208) optionally performs thermal sensing operations to detect whether a person (e.g., a member of the public other than an operator) resides within a specified distance (e.g., 1-2 feet) from the HSD device 100. In some cases, the sensor field of view is matched to a deactivation field in such a way that a person could be in the range of the electric/magnetic field during a deactivation pulse field. Also, the electronic circuit 102 can distinguish between an operator of the HSD device 100 and another person in proximity to the HSD device. If the person does reside within the specified distance of the HSD device 100, then further operation of the HSD device is prevented until the person moves a safe distance (e.g., 10 feet) from the HSD device or is no longer proximate to the HSD device.

If the person does not reside within the specified distance of the HSD device 100, then interrogation operations of the HSD device are initiated. The interrogation operations involve transmitting an interrogation signal in the direction of an EAS security tag. For example, an interrogation signal can include a 1.6 ms burst of the desired interrogation frequency (e.g., 58 KHz), which is transmitted by a transmit module 216 and the air-core coil 104 at a repetition rate of about 40 Hz. Timing of the bursts is controlled by a Programmable Array Logic ("PAL") unit 214. PAL unit 214 can include, but is not limited to, a PAL having part number PALLV16V8z, which is available from Lattice Semiconductor of Portland, Oreg. Typically, depending on the operational mode, the bursts will continue for a default time period (e.g., about three to four minutes) or a selected time period.

Upon receipt of the interrogation signal, the EAS security tag resonates so as to transmit a return signal. In turn, a receive module 218 of the electronic circuit 102 receives the return signal and forwards the return signal to a Digital Signal Processor ("DSP") 210 via an Analog-to Digital ("A-D") convertor 212.

The DSP 210 of the electronic circuit 102 processes the return signal for determining if it is a valid EAS security tag signal. In this regard, the DSP 210 analyzes the return signal to detect selected attributes thereof. For example, the return signal must have proper spectral content and must be received in successive windows as expected. If DSP 210 determines that the return signal is a valid EAS security tag signal, then the DSP 210 signals a microprocessor 208 to initiate optional thermal sensing operations, initiate deactivation operations, or initiate detection indicator operations, depending on the particular operational mode. The indication of an EAS security tag detection can take the form of an audio, visual and/or tactile alert to the user of the HSD device 100.

In some scenarios, the microprocessor 208 includes, but is not limited to, a microprocessor having part number 68HC908GP32 which is available from Motorola, Inc. The present invention is not limited in this regard. Any known or to be known microprocessor can be used herein without limitation.

The thermal sensing operations are generally performed by sensor 250 and microprocessor 208 to detect whether a person (e.g., a member of the public) resides within a specified distance (e.g., 1-2 feet) of the HSD device 100. If the person does reside within the specified distance of the HSD device 100, then further operation of the HSD device is prevented until the person moves a safe distance (e.g., 10 feet) from the HSD device or is no longer proximate to the HSD device.

If the person does not reside within the specified distance of the HSD device 100, then deactivation operations of the HSD device are initiated to deactivate the EAS security tag. For deactivation of the EAS security tag, the microprocessor 208 signals a deactivation module 220 to generate a deactivation pulse for deactivating the EAS security tag. In some scenarios, the deactivation module 220 uses a boost inverter 222 to convert a DC battery voltage of battery 108 into a high current alternating pulse having a decaying envelope. The high current alternating pulse causes the deactivation of the EAS security tag.

In some scenarios, the battery 108 is a rechargeable battery. As such, a Battery Charging Station ("BCS") communication unit 204 is provided to facilitate the recharging of the battery. The BCS communication unit 204 can send battery charge information and battery recharge status information to the microprocessor 208. This information may be output to the user of the HSD device 100 via the interface module 206.

Figure 3:
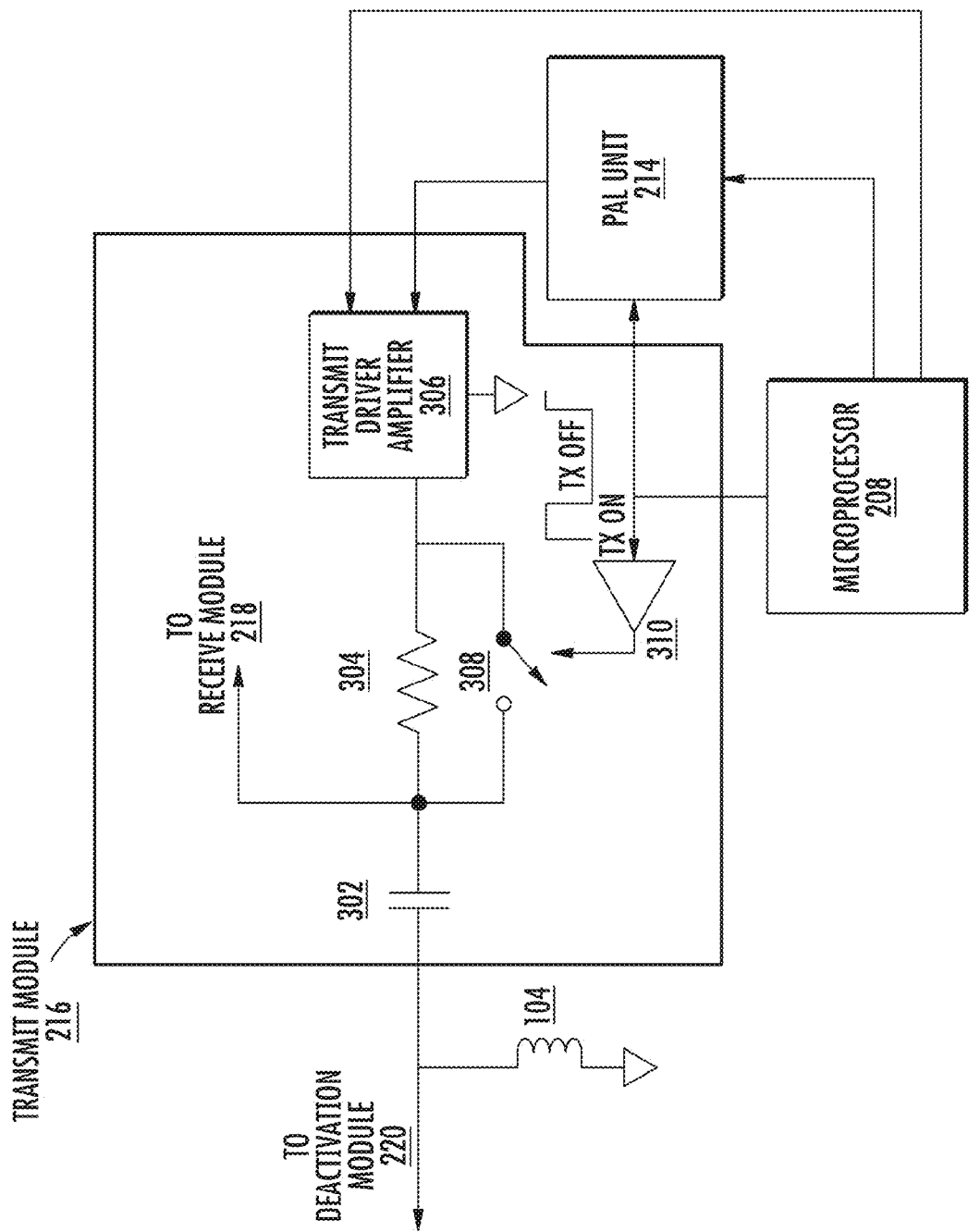
FIG. 3 is a schematic illustration of an exemplary architecture for a transmit module of the HSD shown in FIG. 1.

Referring now to FIG. 3, there is provided a schematic illustration of an exemplary architecture for the transmit module 216 of the HSD device 100. Transmit module 216 comprises a transmit driver amplifier 306, passive components 302, 304, and a switch 308. The switch 308 is coupled to the microprocessor 208. The microprocessor 208 controls the opening and closing of the switch 308 so as to turn on and turn off the transmit module 216. In this regard, the microprocessor 208 may communicate a pulse signal to the switch 308 via a delay 310. The pulse signal causes the switch to transition between an open position and a closed position.

The microprocessor 208 also controls the PAL unit 214 so as to generate an interrogation signal at the proper transmit frequency and burst rate. The interrogation signal is then communicated from the PAL unit 214 to the transmit driver amplifier 306. The transmit driver amplifier 306 sets a value of the transmit current (or power) for the interrogation signal in accordance with information received from the microprocessor 208. The information can be specified via a voltage level of a control signal generated by the microprocessor 208. The voltage level of the control signal is dynamically adjusted based on detected levels of environmental noise. The interrogation signal is then sent from the transmit driver amplifier 306 through a resistor 304 and a capacitor 302 to the air-core coil 104. Next, the interrogation signal is transmitted by the air-core coil 104 at the specified power level.

Figure 4:
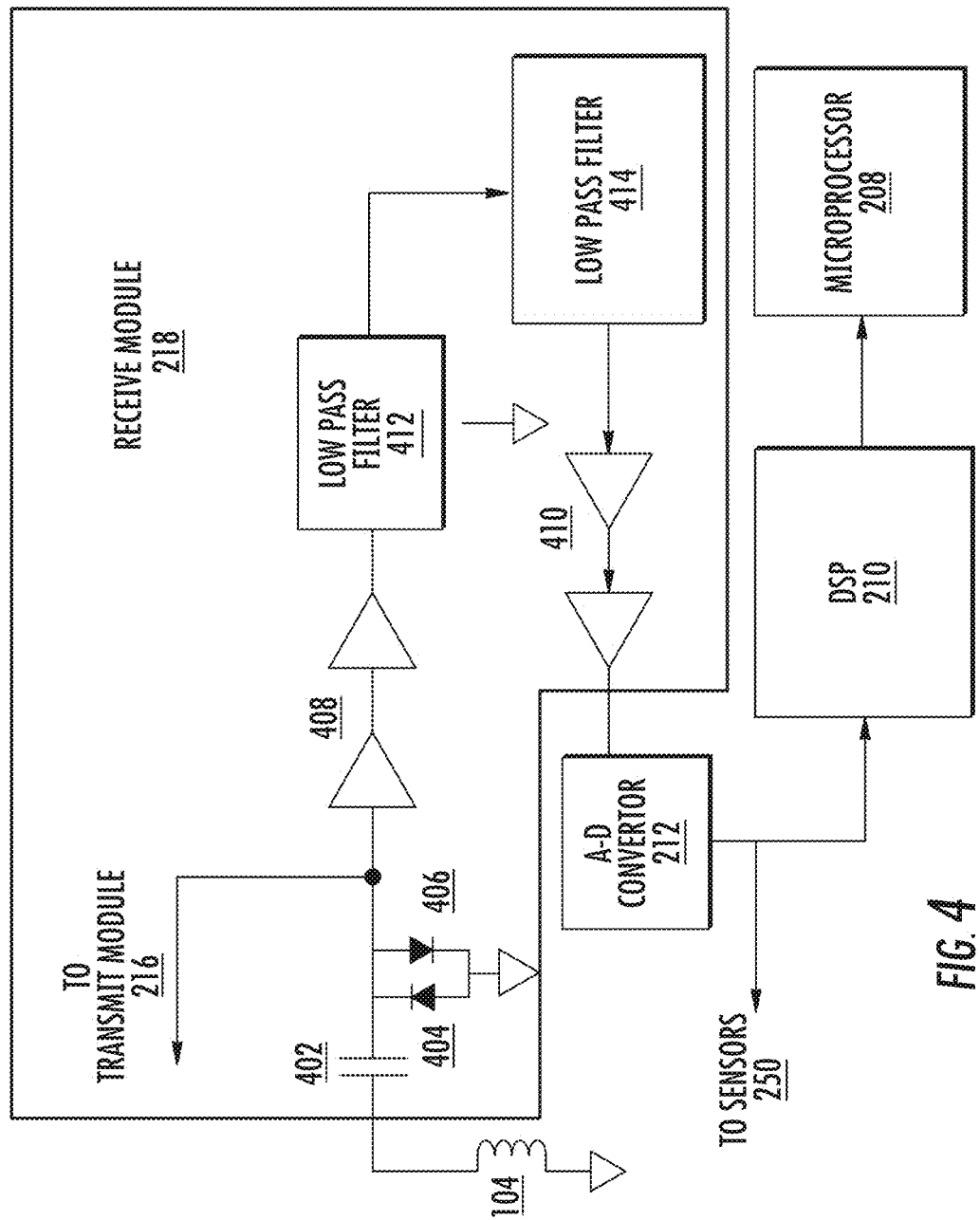
FIG. 4 is a schematic illustration of an exemplary architecture for a receive module of the HSD shown in FIG. 1.

Referring now to FIG. 4, there is provided a schematic illustration of an exemplary architecture for the receive module 218 of the handheld scanning and deactivation device 100. As noted above, the receive module 218 is configured to receive a return signal from an EAS security tag. The return signal from air-core coil 104 passes through a capacitor 402, amplifier stages 408, 410 and low pass filter stages 412, 414. The return signal is then converted from an analog signal to a digital signal by A-D convertor 212. Thereafter, the digital return signal is sent to the DSP 210 for verification processing, as described above. After verification that the digital return signal has valid return signal attributes, the DSP 210 signals the microprocessor 208 that an active EAS security tag has been detected.

Figure 5:
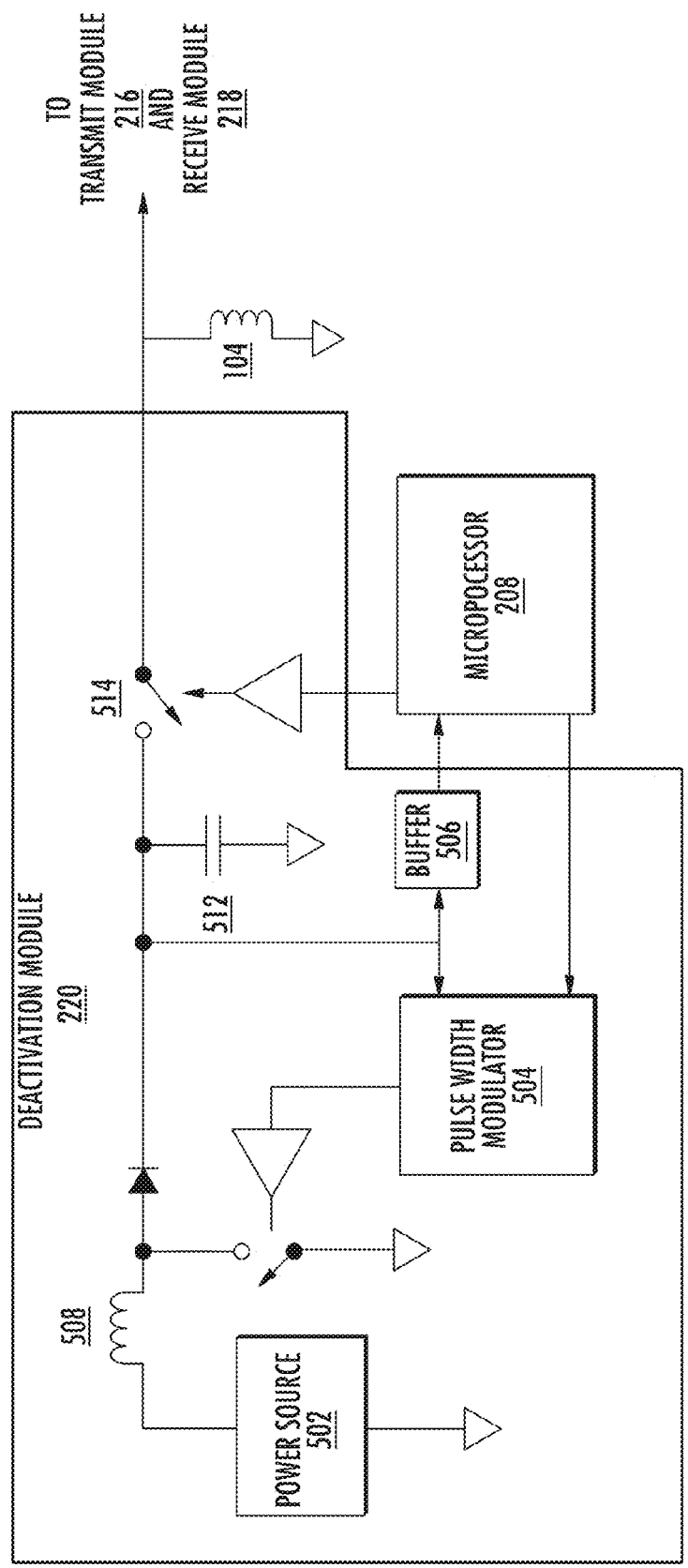
FIG. 5 is a schematic illustration of an exemplary architecture for a deactivation module of the HSD shown in FIG. 1.

Referring now to FIG. 5, there is provided a schematic illustration of an exemplary architecture for the deactivation module 220 of the handheld scanning and deactivation device 100. The deactivation module 220 comprises a Pulse Width Modulator ("PWM") 504. The PWM 504, in conjunction with a capacitor 512 and an inductor 508, form boost invertor 222. As noted above, boost invertor 222 converts a nominal DC battery voltage from a relatively low voltage level (e.g., 8 Volts) to a relatively high level (e.g., 125 Volts). When a switch 514 is closed on command from microprocessor 208, the fully charge capacitor 512 is connected to the air-core coil 104. This initiates a natural resonant discharge producing a decaying alternating sinusoidal current waveform in the air-core coil 104.

In some scenarios, the deactivation frequency is approximately 800 Hz with a 25% decay rate. The inductance value, capacitance value and initial voltage of the capacitor determine the strength of the current waveform. These parameters are sized to produce the magnetic field level of sufficient strength to deactivate an EAS security tag out to a desired range of about three inches. Embodiments of the present invention are not limited to the particulars of these scenarios.

Figure 6A:
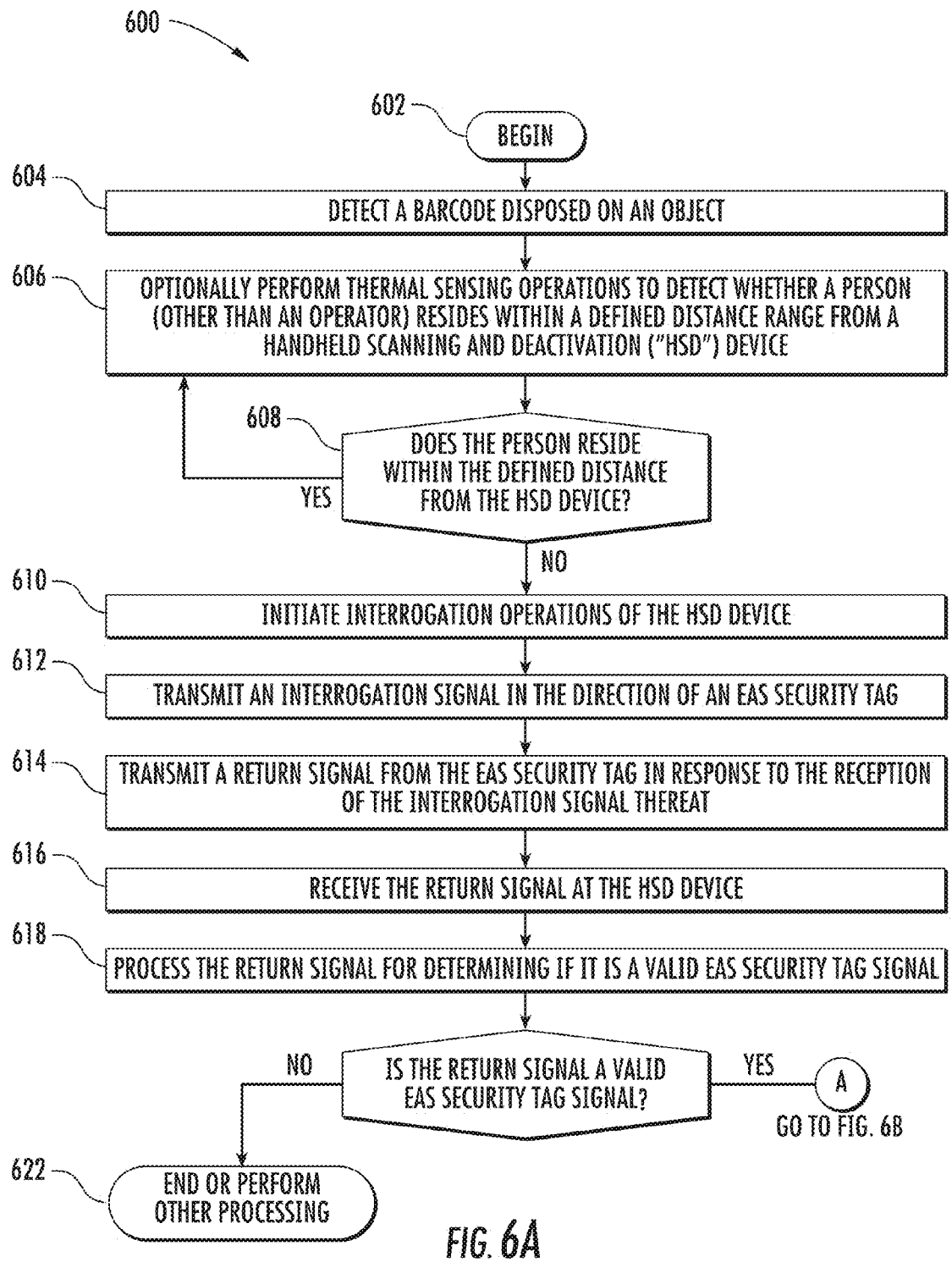
FIGS. 6A-B collectively provide a flow diagram of an exemplary method for controlling operations of the deactivation module shown in FIG. 5.
Figure 6B:
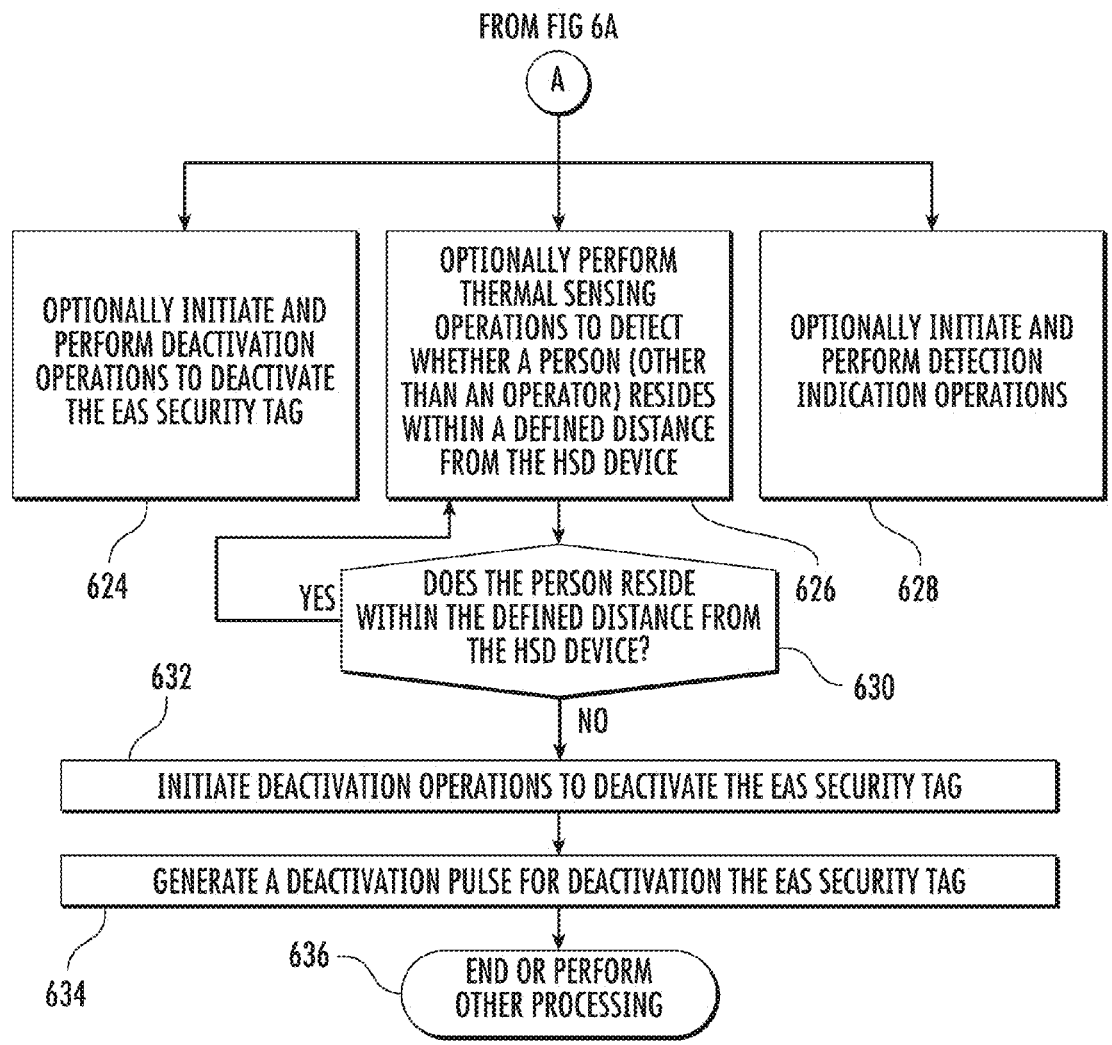
Figure 7:
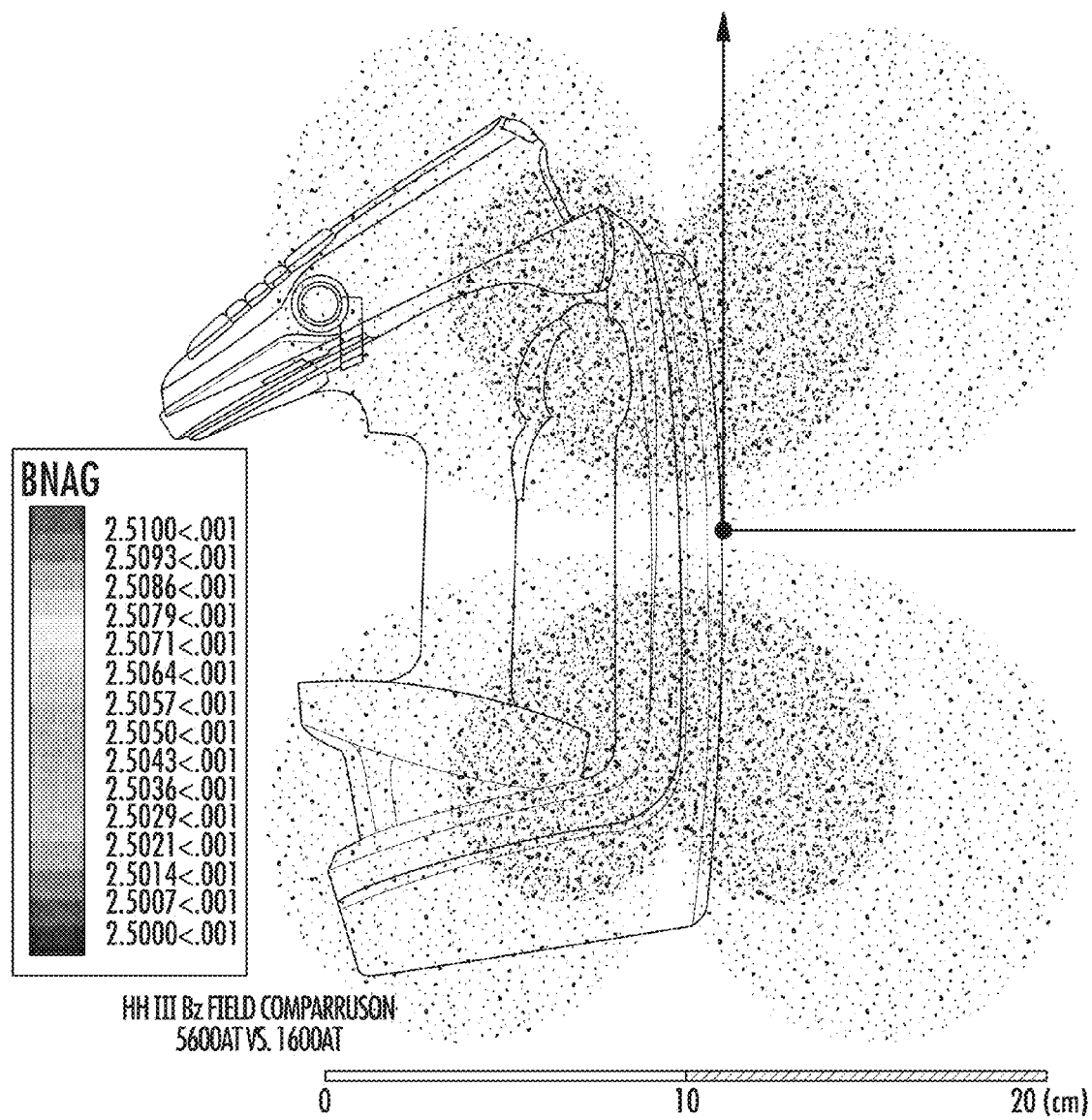
FIG. 7 is a schematic illustration that is useful for understanding a magnetic field pattern of the HSD shown in FIG. 1.

Referring now to FIGS. 6A-6B, there is provided a flow diagram of an exemplary method 600 for controlling operations of an HSD device (e.g., HSD device 100 of FIG. 1). Method 600 begins with step 602 and continues with step 604. In step 604, the HSD device detects a barcode disposed on an object. Thereafter, in step 606, thermal sensing operations may be optionally performed by the HSD device to detect whether a person (other than an operator of the HSD) resides within a defined distance range (e.g., 0-10 feet) of the HSD device. Notably, the HSD device is able to distinguish an operator from another person in proximity thereof. In this regard, the HSD device can detect persons located in front, to the left, and/or to the right thereof. Since the operator will most likely be located in back of the HSD device and the electric/magnetic field does not extend relatively far behind the HSD device as shown in FIG. 7, a thermal sensor of the HSD device (e.g., thermal sensor 250 of FIG. 2) does not necessarily need to detect persons residing behind the HSD device. As such, in some scenarios, the thermal sensor 250 is tuned to only detect human presence and/or movement within a defined distance range from a front, left side, and/or right side of the HSD device. Additionally or alternatively, the microprocessor of the HSD device (e.g., microprocessor 208 of FIG. 1) is configured to determine which detected human presence/movement is located in front of, behind, to the left of, and/or to the right of the HCD device. In this case, the microprocessor may ignore thermal sensor information relating to human presence/movement detected within another defined distance range (e.g., 1-2 feet) behind the HCD device.

If a person is detected within the defined distance range from the HSD device [608:YES], then method 600 returns to step 606 such that additional thermal sensing operations can be performed. In contrast, if a person is not detected within the defined distance range from the HSD device [608:NO], then method 600 continues with step 610. In some scenarios, the defined distance range has a lower limit of zero centimeters and an upper limit of a value representative of distance from said HSD device in which said magnetic field has a strength considered safe for human exposure. Step 610 involves initiating interrogation operations of the HSD device. In effect, the HSD device transmits an interrogation signal in the direction of an EAS security tag, as shown by step 612. In turn, the EAS security tag transmits a return signal, as shown by step 614. In a next step 616, the HSD device receives the return signal.

At the HSD device, the return signal is processed for determining if it is a valid EAS security tag signal, as shown by step 618. If the return signal is not a valid EAS security tag signal[620:NO], then step 622 is performed where method 600 ends or other processing is performed. Alternatively, if the return signal is a valid EAS security tag signal[620:YES], then method 600 continues with step 624, 626 or 628 of FIG. 6B, depending on the mode of the HSD device. Step 624 involves optionally initiating and performing deactivation operations by the HSD device to deactivate the EAS security tag. Step 624 can be performed if the thermal sensing operations of previous steps 606-608 were performed. Step 626 involves optionally initiating and performing detection indication operations by the HSD device.

Step 628 involves optionally performing thermal sensing operations to detect whether a person (other than an operator of the HCD device) resides within a defined distance range from the HSD device. Step 628 can be performed if the thermal sensing operations of previous steps 606-608 were or were not performed. Step 628 is similar to step 606. As such the discussion of step 606 is sufficient for understanding step 628.

If the person does reside within the defined distance range from the HSD device [630:YES], then method 600 returns to step 628. In contrast, if the person does not reside within the defined distance range from the HSD device [630:NO], then the method continues with step 632. In step 632, deactivation operations of the HSD device are initiated for deactivating the EAS security tag. Accordingly, the HSD device generates a deactivation pulse for deactivating the EAS security tag, as shown by step 634. Subsequently, step 636 is performed where method 600 ends.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed:

1. A method for controlling operations of a Handheld Scanning and Deactivation ("HSD") device, the method comprising:
    detecting, by the HSD device, a valid Electronic Article Surveillance ("EAS")security tag signal or a barcode on an object;
    initiating thermal sensor operations of the HSD device in response to a detection of the valid EAS security tag or the barcode;
    determining whether a human is located within a defined distance range of said HSD device using sensor data acquired during the thermal sensor operations, wherein the human is remote from the HSD device and the object having at least one of the barcode and EAS security tag coupled thereto;
    preventing first operations from being performed by said HSD device which cause a magnetic field to be generated for deactivation of the EAS security tag, in response to a determination that said human is located within said defined distance range of said HSD device; and
    initiating said first operations to deactivate the EAS security tap if it is determined that said human is not located within said defined distance range of said HSD device.

2. The method according to claim 1, further comprising performing interrogation operations by the HSD device for detecting a presence of an EAS security tag.

3. The method according to claim 1, wherein said defined distance range has a lower limit of zero centimeters and an upper limit of a value representative of distance from said HSD device in which said magnetic field has a strength considered safe for human exposure.

4. The method according to claim 1, further comprising determining whether said human, located within said defined distance range of said HSD device, is a person other than an operator of said HSD device.

5. The method according to claim 4, wherein said preventing step is performed when it is determined that said human, located within said defined distance range of said HSD device, is a person other than said operator.

6. The method according to claim 4, wherein said first operations are initiating when it is determined that said human, located within said defined distance range of said HSD device, is said operator.

7. A Handheld Scanning and Deactivation ("HSD") device, comprising:
    an electronic circuit configured to
        detect a valid Electronic Article Surveillance ("EAS") security tap signal or barcode on an object,
        initiate thermal sensor operations in response to a detection of the valid EAS security tap signal or barcode,
        determine whether a human is located within a defined distance range of said HSD device using sensor data acquired during the thermal sensor operations, where the human is remote from the HSD device and the object having at least one of the barcode and EAS security tag coupled thereto, prevent first operations from being performed by said HSD device which cause a magnetic field to be generated for deactivation of the EAS security tag, in response to a determined that said human is located within said defined distance range of said HSD device, and initiate said first operations to deactivate the EAS security tag if it is determined that said human is not located within said defined distance range of said HSD device.

8. The HSD device according to claim 7, wherein the electronic circuit is further configured to perform interrogation operations for detecting a presence of an electronic article surveillance security tag.

9. The HSD device according to claim 7, wherein said defined distance range has a lower limit of zero centimeters and an upper limit of a value representative of distance from said HSD device in which said magnetic field has a strength considered safe for human exposure.

10. The HSD device according to claim 7, wherein said electronic circuit is further configured to determine whether said human, located within said defined distance range of said HSD device, is a person other than an operator of said HSD device.

11. The HSD device according to claim 10, wherein said preventing step is performed when it is determined that said human, located within said defined distance range of said HSD device, is a person other than said operator.

12. The HSD device according to claim 10, wherein said first operations are initiated when it is determined that said human, located within said defined distance range of said HSD device, is said operator.

* * * * *